United States Patent
Schmidt et al.

(10) Patent No.: US 11,826,694 B2
(45) Date of Patent: Nov. 28, 2023

(54) PROCESS AND PLANT FOR REMOVING CARBON DIOXIDE FROM SYNTHESIS GAS

(71) Applicant: L'Air Liquide, Société Anonyme pour l'Etude et l'Exploitation des Procédés Georges Claude, Paris (FR)

(72) Inventors: Sophia Schmidt, Frankfurt am Main (DE); Matthias Linicus, Eppstein (DE); Sharon Corbet, Frankfurt (DE)

(73) Assignee: L'Air Liquide, Société l'Etude et l'Exploitation des Procédés Georges Claude, Paris (FR)

( * ) Notice: Subject to any disclaimer, the term of this patent is extended or adjusted under 35 U.S.C. 154(b) by 21 days.

(21) Appl. No.: 17/524,026

(22) Filed: Nov. 11, 2021

(65) Prior Publication Data
US 2022/0143546 A1    May 12, 2022

(30) Foreign Application Priority Data
Nov. 11, 2020 (EP) .................................... 20020521

(51) Int. Cl.
*B01D 53/00* (2006.01)
*B01D 53/14* (2006.01)
(Continued)

(52) U.S. Cl.
CPC ......... *B01D 53/1418* (2013.01); *B01D 3/143* (2013.01); *B01D 19/0005* (2013.01);
(Continued)

(58) Field of Classification Search
CPC .......... B01D 19/00; B01D 3/14; B01D 53/14; B01D 53/18; B01D 53/26; C01B 3/12
See application file for complete search history.

(56) References Cited

U.S. PATENT DOCUMENTS

2005/0172807 A1    8/2005  Mak
2008/0223214 A1    9/2008  Palamara et al.
(Continued)

FOREIGN PATENT DOCUMENTS

EP    1 804 956    11/2013
EP    2 683 465    5/2018
(Continued)

OTHER PUBLICATIONS

European Search Report for corresponding EP 20020521.9, dated May 10, 2021.

*Primary Examiner* — Sharon Pregler
(74) *Attorney, Agent, or Firm* — Elwood L. Haynes

(57) ABSTRACT

The present invention relates to a process for removing carbon dioxide from synthesis gas using a hygroscopic, physical absorption medium. The process includes cooling the absorption medium and the synthesis gas; water is at least partially removed from the synthesis gas by condensation; carbon dioxide is removed from the cooled synthesis gas via the cooled absorption medium in a physical absorption step at elevated pressure; laden absorption medium is treated in a plurality of serially arranged flash stages, wherein co-absorbed carbon monoxide and hydrogen are removed from the laden absorption medium in at least one first flash stage, and carbon dioxide is removed from the laden absorption medium in a flash stage arranged downstream of the first flash stage. The process features a high rate of separated carbon dioxide and a pure and dry (anhydrous) carbon dioxide product. The invention further relates to a plant for performing the process.

18 Claims, 1 Drawing Sheet

(51) Int. Cl.
    *B01D 3/14*     (2006.01)
    *B01D 19/00*     (2006.01)
    *B01D 53/18*     (2006.01)
    *B01D 53/26*     (2006.01)
    *C01B 3/12*     (2006.01)

(52) U.S. Cl.
CPC ....... *B01D 19/0036* (2013.01); *B01D 53/145* (2013.01); *B01D 53/1425* (2013.01); *B01D 53/1475* (2013.01); *B01D 53/1493* (2013.01); *B01D 53/18* (2013.01); *B01D 53/265* (2013.01); *C01B 3/12* (2013.01); *B01D 2252/2021* (2013.01); *B01D 2252/20468* (2013.01); *C01B 2203/0283* (2013.01)

(56) References Cited

U.S. PATENT DOCUMENTS

2011/0203314 A1     8/2011    Mak
2012/0073441 A1     3/2012    Mak
2018/0326348 A1*  11/2018   Tanna ................ B01D 53/1493
2020/0075981 A1     3/2020    Jahnke et al.
2021/0402347 A1*  12/2021   Szabo .................... C10K 1/004

FOREIGN PATENT DOCUMENTS

EP         3 362 406      7/2019
WO    WO 2017 075000    6/2012

* cited by examiner

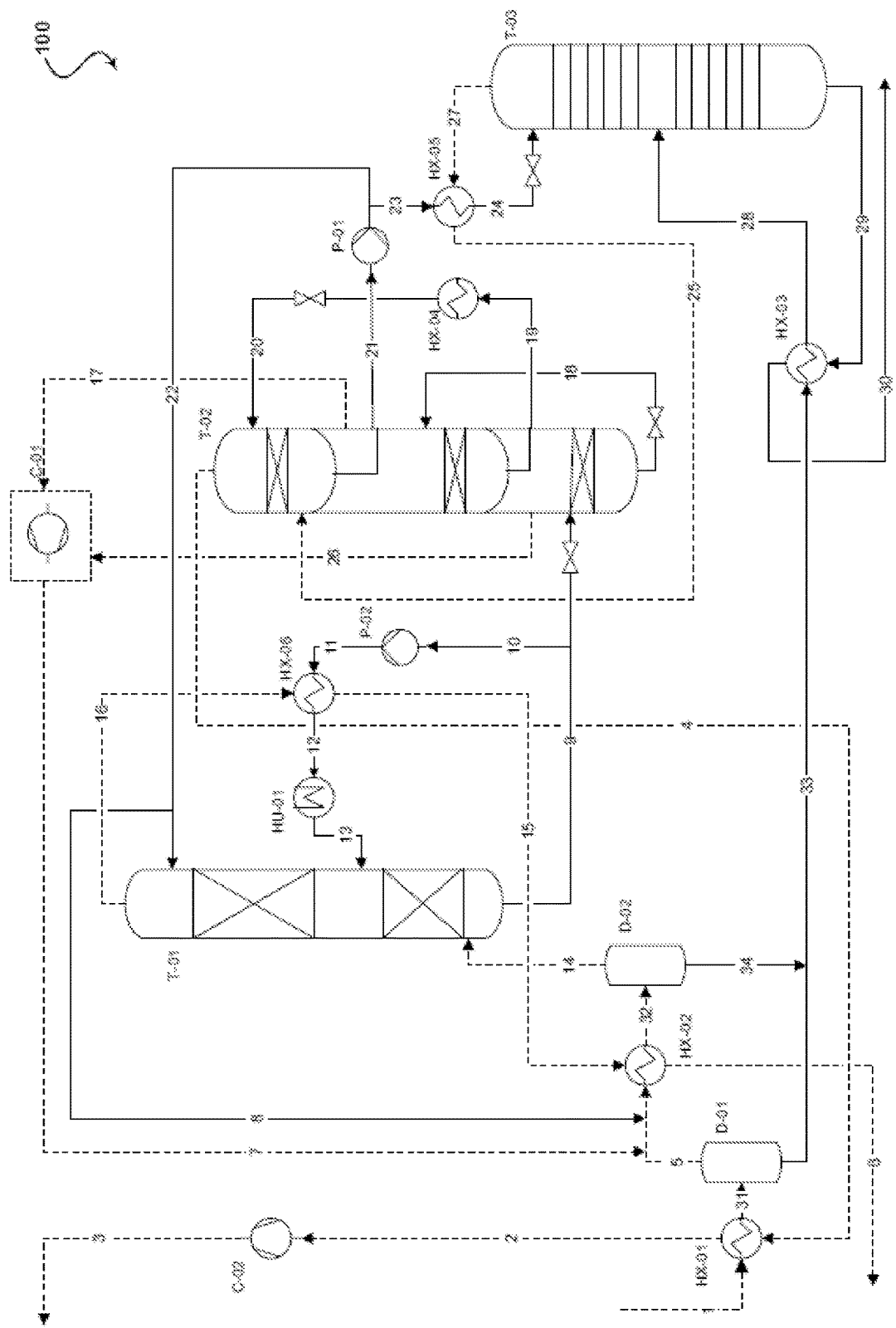

PROCESS AND PLANT FOR REMOVING CARBON DIOXIDE FROM SYNTHESIS GAS

CROSS REFERENCE TO RELATED APPLICATIONS

This application claims priority to European Patent Application No. EP 20020521.9, filed Nov. 11, 2020, the entire contents of which are incorporated herein by reference.

BACKGROUND

Field of the Invention

The invention relates to a process for removing carbon dioxide ($CO_2$) from synthesis gas, in particular in the production of hydrogen ($H_2$). The invention further relates to a plant for removing carbon dioxide ($CO_2$) from synthesis gas, in particular as part of a plant for producing hydrogen ($H_2$).

Prior Art

Producing hydrogen on the basis of fossil inputs often comprises a reforming step for synthesis gas production from a gaseous fossil input such as natural gas, a water gas shift unit for increasing hydrogen yield and a hydrogen purification stage based on a pressure swing adsorption (PSA). Typical reforming steps are reforming of natural gas with steam (steam methane reforming—SMR), autothermal reforming (ATR), partial oxidation (POx), combinations thereof or gas-heated reforming (GHR).

Each of the recited reforming steps and especially the water gas shift reaction generates carbon dioxide ($CO_2$) as a by-product. To avoid $CO_2$ emissions this carbon dioxide should be separated from the process as efficiently as possible and subsequently sent either to long-term storage (carbon capture and storage—CCS) or to a further utilization (carbon capture and utilization—CCU).

Carbon dioxide separation may employ for example gas scrubbing processes in which solvents chemically bind the gas to be separated (chemical absorption). Such a process is described for example in EP 3 362 406. The solvents used for chemical absorption are in most cases aqueous solutions of amines or amino alcohols, for example methyldiethanolamine (MDEA). Due to the strong chemical bond between the basic amine/amino alcohol and the acidic target molecule carbon dioxide a great deal of energy is required to regenerate the solvent, i.e. to free the solvent of chemically bonded carbon dioxide again. Furthermore, the carbon dioxide freed of aqueous solvent regularly contains about 3% to 7% water. However, for most CCS or CCU applications the water must be removed in an upstream step. Such steps are for example the drying of the carbon dioxide by washing with triethylene glycol or the adsorption of the water over molecular sieves.

EP 2 683 465 describes a process for separating carbon dioxide which combines a physical gas scrubbing with subsequent condensation of carbon dioxide. For condensation of the carbon dioxide a carbon dioxide-rich gas is cooled and compressed in several steps until the triple point is reached. The liquefied carbon dioxide stream may subsequently be separated from the remaining gases. The cooling and compression of the carbon dioxide down to the triple point to separate the carbon dioxide from the remaining gases requires complex apparatus and is associated with high energy requirements.

EP 1 804 956 discloses a process for recovery of dry carbon dioxide in high purity from a hydrogen production process. In this process a pressurized carbon dioxide-rich gas from a hydrogen recovery stage is initially cooled before carbon dioxide is condensed. The remaining carbon dioxide is subsequently removed by physical absorption in methanol. The carbon dioxide-laden methanol is regenerated by stepwise pressure reduction and recycled to an absorber. The disadvantage of this process is in turn that the majority of the carbon dioxide must be separated from the remaining gases by condensation which is energy intensive and requires complex apparatus.

SUMMARY

It is a general object of the present invention to overcome the abovementioned disadvantages of the prior art.

Having regard to gas purification processes based on chemical absorption it is an object to propose a less energy intensive process.

Having regard to existing gas purification processes by chemical absorption it is a further object to propose a process which does not require a separate drying step for removal of water from the separated carbon dioxide.

With increasing hydrogen production capacities, for example of more than 300 $kNm^3$ per hour, a single-line process for removal of carbon dioxide by amine scrubbing is often no longer sufficient. This results in an increase in capital costs. The same applies to energy consumption for regeneration of the solvent which is typically covered internally by heat transfer from hot synthesis gas or internally produced steam. In very large hydrogen production plants it may therefore be necessary to use external energy sources for regeneration of solvents laden with carbon dioxide through chemical absorption. An "external" energy source is to be understood here as meaning an energy source which provides energy from another process or another plant but not the hydrogen production plant in question.

It is therefore a further object of the present invention to propose a process which does not require an external energy source for regeneration of the solvent even at large hydrogen production capacities.

The process according to EP 2 683 465 requires regeneration of the physical solvent with steam to remove carbon dioxide together with hydrogen sulfide and to obtain a separated gas having a sufficient carbon dioxide content. The water thus bound to carbon dioxide must be removed before the compression and condensation of the carbon dioxide. The process therefore requires both a drying step and an energy intensive condensation step. Condensation of the physical absorption medium, for example methanol, may also be provided for.

It is thus a further object of the present invention to propose a process which does not require a drying step for removal of water or a condensation step in respect of the separated carbon dioxide.

It is generally also a further object of the invention to propose a process for separating carbon dioxide which generates carbon dioxide as a (by)product in high purity while simultaneously ensuring low operating costs (OPEX) and/or capital costs (CAPEX).

It is a further object of the present invention to propose a plant which at least partially achieves at least one of the abovementioned objects.

It is a further object of the present invention to propose a use of a process or a plant which at least partially achieves at least one of the abovementioned objects.

The independent claims make a contribution to the at least partial achievement of at least one of the above objects. The dependent claims provide preferred embodiments which contribute to the at least partial achievement of at least one of the objects. Preferred embodiments of constituents of one category according to the invention are, where relevant, likewise preferred for identically named or corresponding constituents of a respective other category according to the invention.

The terms "having", "comprising" or "containing", etc., do not preclude the possible presence of further elements, ingredients, etc. The indefinite article "a" does not preclude the possible presence of a plurality.

The objects of the invention are at least partially solved by a process for removing carbon dioxide ($CO_2$) from synthesis gas, wherein the synthesis gas comprises at least hydrogen ($H_2$), carbon monoxide (CO), carbon dioxide ($CO_2$) and water ($H_2O$), comprising the process steps of:

(a) providing a hygroscopic physical absorption medium;
(b) at least partially removing water from the synthesis gas by cooling the synthesis gas below the dew point of water and separating the condensed water;
(c) cooling the absorption medium;
(d) removing carbon dioxide from the cooled synthesis gas via the cooled absorption medium in a physical absorption step at elevated pressure, wherein the cooled synthesis gas and the cooled absorption medium are run in countercurrent, wherein synthesis gas at least partially freed of water and carbon dioxide is obtained and absorption medium laden with carbon dioxide and partially co-absorbed carbon monoxide and hydrogen is obtained;
(e) discharging the synthesis gas at least partially freed of water and carbon dioxide from the process;
(f) treating the laden absorption medium in a plurality of serially arranged flash stages, wherein co-absorbed carbon monoxide and hydrogen is removed from the laden absorption medium in at least one first flash stage and carbon dioxide is removed from the laden absorption medium in a flash stage arranged downstream of the first flash stage;
(g) compressing to absorption pressure and recycling to step (d) the carbon monoxide and hydrogen obtained in step (f);
(h) discharging the carbon dioxide obtained in step (f) from the process.

The abovementioned steps (a) to (h) need not necessarily be performed in the recited sequence.

The use of a physical absorption medium allows regeneration thereof after the absorption of carbon dioxide by a simple, energy-unintensive flash step. Necessarily and unavoidably co-absorbed value gases (hydrogen, carbon monoxide) are removed from the absorption medium here in at least one first flash stage. The thus partially regenerated absorption medium is supplied to a flash stage arranged downstream of the first flash stage. At this juncture the laden absorption medium contains predominantly carbon dioxide as the absorbed gas component and possibly water not removed in step (b). The gas desorbed in the downstream flash stage thus contains virtually exclusively carbon dioxide.

"Flashing", a "flash step" or a "flash stage" is understood by a person skilled in the art as meaning the regeneration of the absorption medium, i.e. desorption of physically bonded gases from the absorption medium by pressure reduction.

The absorption of carbon dioxide in a physical, hygroscopic absorption medium and subsequent regeneration by pressure reduction is sufficient to achieve high carbon dioxide separation rates from the synthesis gas. In particular this procedure is sufficient to achieve high carbon dioxide separation rates from a hydrogen-rich synthesis gas. A hydrogen-rich synthesis gas is in particular obtained from conventionally produced synthesis gas through a water gas shift (WGS).

Compared to the chemical absorption of carbon dioxide in basic, in particular aminic, solvents a flash step requires no energy for removing the carbon dioxide from the absorption medium. This leads to a reduction in the operating costs of the plant (OPEX). Capital costs are also reduced simultaneously since fewer plant components such as hot regenerator columns, heat exchangers for laden/regenerated solvent and boilers are required.

When using a hygroscopic solvent as absorption medium any water not removed in the condensation according to step (b) remains bound to the absorption medium even during the treatment according to step (f). The carbon dioxide desorbed from the absorption medium in step (f) is thus dry in the sense that it contains no bound water. Furthermore, any water not removed in the condensation according to step (b) is absorbed by the absorption medium through dissolution in the hygroscopic absorption medium in the absorption according to step (d).

In the context of the present invention a hygroscopic absorption medium is understood as meaning an absorption medium having a high absorption capacity for water. In particular, the hygroscopic absorption medium has a high solubility for water. In particular, the hygroscopic absorption medium is miscible with water in any ratio.

A "physical absorption medium" is to be understood as meaning an absorption medium where the solubility of the absorbed gases in the absorption medium is brought about by physical interactions. In particular the absorption in the physical absorption medium is not brought about by chemical interactions such as for example an acid-base interaction, in particular an interaction in the sense of a bond of a Lewis acid to a Lewis base.

The absorption of carbon dioxide in the hygroscopic, physical absorption medium according to step (d) is performed at elevated pressure. The absorption step (d) is in particular performed at an absolute pressure of 10 to 100 bar, preferably at 20 to 60 bar. A resulting high carbon dioxide partial pressure (absorption under high pressure) favours physical absorption by the absorption medium whereas the absorption capacity in a chemical absorption depends solely on the amount or concentration of the absorption medium provided. In an absorption by chemical absorption media the absorption capacity thus cannot be enhanced by increasing the pressure.

To improve the absorption capacity of the absorption medium the absorption medium is cooled according to step (c). The target temperature during cooling of the absorption medium depends on the physical properties of the absorption medium, such as for example
 the melting point,
 the temperature dependence of the viscosity and
 the dependence of the carbon dioxide absorption capacity on temperature.

If for example N-methyl-2-pyrrolidone (NMP) is used as the absorption medium this is cooled to a temperature of not less than 0° C. If for example methanol is used as the absorption medium this is cooled to a temperature of preferably less than −30° C.

The process according to the invention also has the advantage that the majority of the water in the synthesis gas is removed by condensation in step (b) before the separation of the carbon dioxide from the remaining gas constituents of the synthesis gas commences. Since no water is required as process medium in the course of the further process only relatively small amounts of water subsequently require removal from the process. As mentioned above this residual water remains bound to the hygroscopic absorption medium and may optionally be freed therefrom by a thermal separation process (distillation, rectification).

One embodiment of the process according to the invention is therefore characterized in that water is removed from the absorption medium in a distillation step arranged downstream of step (f).

Water not removed from the synthesis gas by condensation in step (b) may accumulate in the absorption medium over a longer period during performance of the process. To obtain a high absorption capacity of the absorption medium the water is preferably removed in a distillation step downstream of step (f). The distillation step is preferably a rectification step in a rectification column.

Water not removed by condensation in step (b) is absorbed by the absorption medium primarily in the absorption step according to step (d). Strictly speaking this is not a physical absorption, rather the water is dissolved in the absorption medium. In one embodiment this dissolution operation may have a dedicated absorption stage provided for it which is kept separate from the absorption step in which the majority of the carbon dioxide is absorbed by absorption medium according to step (d), One embodiment of the process according to the invention is therefore characterized in that water is removed by cooled absorption medium in a further physical absorption step at elevated pressure. Expressed another way, one embodiment of the process according to the invention is characterized in that water is removed by cooled absorption medium in a further step by dissolution in the absorption medium at elevated pressure.

In one embodiment the water obtained in step (b) by condensation is also sent to the distillation step arranged downstream of step (f) and removed together with water that has accumulated in the absorption medium. The entire thermal separation of water and absorption medium therefore requires only a single rectification column for the process. In a further embodiment absorbed or distilled water in the dedicated absorption stage optionally present for the absorption or dissolution of water is also sent to the distillation step arranged downstream of step (f).

One embodiment of the process according to the invention is characterized in that the distillation step for removal of water is operated temporarily, in particular temporarily as a consequence of exceedance of a threshold concentration of water in the absorption medium.

This measure makes it possible to save further energy. Since water accumulates in the absorption medium over time only slowly and the absorption capacity thus falls only slowly, it may be sufficient to operate the distillation step for removal of water only temporarily. "Temporarily" is to be understood as meaning that the distillation step is performed at certain times during performance of the process and not performed at certain other times. The latter is possible for example through a corresponding bypass arrangement of conduits and further components.

One embodiment of the process according to the invention is characterized in that absorption medium vapours obtained in the distillation step are utilized as a stripping medium for removal of carbon dioxide in the downstream flash stage according to step (f).

The distillation step for separation of water from the absorption medium arranged downstream of step (f) generates absorption medium vapours. In one embodiment these absorption medium vapours are generated as top product, for example when the absorption medium has a lower boiling point than water. Instead of condensing these absorption medium vapours and recycling them to step (d) as cooled, liquid absorption medium said vapours are in this embodiment utilized as stripping medium for removal of the carbon dioxide in the downstream flash stage according to step (f). This makes it possible to further increase the amount of separated carbon dioxide without any additional energy requirements. Contrary to expectations it was further found that the hot absorption medium vapours do not reduce the efficiency of the overall process which is fundamentally configured for absorption of carbon dioxide in a cold or cryogenic absorption medium. In particular the overall performance of the plant in terms of refrigeration balance (refrigeration power and cooling water) is not adversely affected. It is a further advantage that the absorption medium vapours obtained in the distillation step are chemically identical to the absorption medium. Accordingly, no "foreign" stripping medium requiring subsequent removal from the stripped gas is introduced into the absorption medium.

In the context of the present invention a stripping medium is to be understood as meaning a medium which is incorporated, for example introduced, into the laden absorption medium during a flash step and displaces gas constituents, preferably carbon dioxide, bound to the absorption medium from the absorption medium.

The absorption medium vapours are utilized as stripping medium in the sense that the absorption medium vapours are incorporated, in particular introduced, into the laden absorption medium. The laden absorption medium is not heated to its boiling point or boiling temperature. In one embodiment the laden absorption medium is heated to a temperature at least 10 K below the boiling temperature of the absorption medium or to a temperature at least 15 K below the boiling temperature of the absorption medium or to a temperature at least 20 K below the boiling temperature of the absorption medium.

In addition or alternatively to the utilization of the absorption medium vapours as stripping medium the laden absorption medium may before or during treatment in the plurality of serially arranged flash stages be heated by an internal and/or external energy source. The internal and/or external energy source is independent of the absorption media vapours as an energy source, i.e. the absorption medium vapours comprise no energy from the internal and/or external energy source. In particular the laden absorption medium is heated by heat exchange with a hot internal or external process medium. This makes it possible to further increase the amount of carbon monoxide, hydrogen and carbon dioxide removed from the laden absorption medium by step (f).

In one embodiment the laden absorption medium is heated by the internal and/or external energy source exclusively before or during the downstream flash stage. Since carbon monoxide and hydrogen bind only weakly to many absorption media, in particular methanol, a heating of the at least first flash stage via an internal and/or external energy source is not mandatory.

Step (f) affords an at least partially regenerated absorption medium which essentially contains only water as an "impurity". In one embodiment the at least partially regenerated absorption medium obtained in the downstream flash stage is sent to the distillation step arranged downstream of step (f). If the laden absorption medium is heated before or during the treatment according to step (f) this heating may in one embodiment be effected by a portion, i.e. a substream, of the synthesis gas as an internal energy source. This portion of the synthesis gas is not cooled according to step (b). By contrast, the cooling of this portion of the synthesis gas is effected by the heat transfer from the synthesis gas to the laden absorption medium to be heated. This improves the thermal integration of the process.

One embodiment of the process according to the invention is characterized in that absorption medium vapours obtained in the distillation step are condensed and the condensed absorption medium is subsequently reused in the absorption step according to step (d).

One embodiment of the process according to the invention is characterized in that the downstream flash stage has a lower pressure compared to the first flash stage.

In one embodiment the first flash stage for removal of co-absorbed carbon monoxide and hydrogen has a pressure of 10 to 25 bar, preferably of 15 to 20 bar, particularly preferably of 18 bar. In one embodiment step (f) comprises a second flash stage for removal of co-absorbed carbon monoxide and hydrogen. In one embodiment the second flash stage has a pressure of 5 to 12 bar, preferably of 6 to 10 bar, particularly preferably of 8 bar. In one embodiment the downstream flash stage has a pressure of 1 to 2 bar, preferably of 1.1 to 1.5 bar, particularly preferably of 1.3 bar. In one embodiment the downstream flash stage has a pressure below atmospheric pressure, for example a pressure of 0.1 to 1 bar. Subatmospheric pressure in the downstream flash stage allows the amount of separated carbon dioxide to be further increased.

One embodiment of the process according to the invention is characterized in that absorption medium obtained in the downstream flash stage is recycled to the physical absorption step according to step (d) for reabsorption of carbon dioxide.

One embodiment of the process according to the invention is characterized in that the synthesis gas is in a process step upstream of the process subjected to a water gas shift reaction to increase the hydrogen yield, thus enriching the synthesis gas with water and carbon dioxide.

One embodiment of the process according to the invention is characterized in that the synthesis gas comprises no sulfur compounds as impurities, in particular no hydrogen sulfide ($H_2S$) and/or no carbonyl sulfide (COS) as an impurity.

One embodiment of the process according to the invention is characterized in that the synthesis gas comprises no hydrogen cyanide (HCN) and/or no ammonia ($NH_3$) as an impurity.

The synthesis gas is preferably produced by steam reforming (SMR), partial oxidation (POX), autothermal reforming (ATR), gas-heated reforming (GHR) or combinations thereof of gaseous carbon-containing input materials, preferably natural gas. It is preferable when the carbon-containing input material has been subjected to a hydrodesulfurization. Thus produced synthesis gases contain none of the abovementioned sulfur compounds and/or nitrogen compounds distinct from molecular nitrogen ($N_2$) as impurities. In one embodiment the synthesis gas moreover comprises methane unreacted during synthesis gas production or other higher homologous hydrocarbons that have not been converted into synthesis gas.

One embodiment of the process according to the invention is characterized in that the process comprises no hot regeneration step for regenerating the laden absorption medium. Especially the abovementioned sulfur compounds, in particular hydrogen sulfide ($H_2S$), are typically removed by an energy intensive hot regeneration step. Hydrogen sulfide has a high absorption coefficient relative to many absorption media, in particular methanol. The process according to the invention does not necessitate such a hot regeneration step. It is therefore particularly energy-saving and therefore has low operating costs (OPEX). Since a hot regeneration step necessitates a dedicated column the capital costs (CAPEX) for the process according to the invention are also low.

In the context of the present invention "hot regeneration" is to be understood as meaning a process step comprising the desorption of absorbed gases with introduction of heat into the laden absorption medium, wherein the absorption medium is heated to boiling by introduction of heat. The abovementioned introduction of absorption medium vapours into the laden absorption medium is explicitly not to be understood as a hot regeneration since this merely heats the absorption medium to a temperature below its boiling temperature.

One embodiment of the process according to the invention is characterized in that the carbon dioxide is not subjected to a drying step after discharging from the process according to step (h).

As mentioned above the process according to the invention requires no drying step for the carbon dioxide discharged from the process according to step (h). The majority of water is removed from the synthesis gas by cooling the synthesis gas below the dew point of water and condensation of the water according to step (b), Water not removed by this step is absorbed by the hygroscopic absorption medium and optionally removed from the absorption medium by distillation in a further step. In contrast to a process with chemical absorption in which water and/or a water/amine mixture is used as stripping medium additional process water or additional process steam is not provided for.

One embodiment of the process according to the invention is characterized in that the carbon dioxide is not subjected to a condensation step, in particular after discharging from the process according to step (h).

The process according to the invention does not necessitate an energy intensive and high apparatus complexity condensation step for carbon dioxide for separation thereof from the other gas constituents. The combination of the process steps according to the invention affords a pure and anhydrous (dry) carbon dioxide product without any need for a condensation step in respect of the carbon dioxide.

One embodiment of the process according to the invention is characterized in that the provided hygroscopic, physical absorption medium comprises methanol or consists substantially of methanol or consists of methanol. The hygroscopic, physical absorption medium preferably comprises at least 90% by volume of methanol or at least 95% by volume of methanol or at least 99% by volume of methanol or at least 99.5% by volume of methanol or at least 99.9% by volume of methanol.

Methanol has the advantage that it has a very high absorption coefficient for carbon dioxide which increases with increasing pressure and decreasing temperature. It is miscible with water in any ratio and has a low viscosity even at very low temperatures. It may therefore be readily used as an absorption medium at temperatures of less than −30° C. (minus thirty degrees Celsius).

One embodiment of the process according to the invention is characterized in that the provided hygroscopic, physical absorption medium comprises N-methyl-2-pyrrolidone (NMP) or consists substantially of NMP or consists of NMP. The hygroscopic, physical absorption medium preferably comprises at least 90% by volume of NMP or at least 95% by volume of NMP or at least 99% by volume of NMP or at least 99.5% by volume of NMP.

One embodiment of the process according to the invention is characterized in that after discharging from the process according to step (h) the carbon dioxide is compressed and optionally liquefied and subsequently stored or sent to a further use. Before the carbon dioxide is sent for long-term storage it is typically compressed. This is often also necessary when the carbon dioxide is to be sent to a further use, for example for intermediate storage in pressurized tanks.

One embodiment of the process according to the invention is characterized in that an inert gas, in particular nitrogen ($N_2$), is utilized as stripping medium for removal of carbon dioxide in the downstream flash stage according to step (f).

This makes it possible to further increase the yield of separated carbon dioxide.

In one embodiment of the process according to the invention a portion of the hydrogen and carbon monoxide obtained in step (f) is used as fuel, in particular as fuel for the production of the provided synthesis gas. This portion of the hydrogen and carbon monoxide obtained in at least the first flash stage is not recycled to the absorption step according to step (d).

The objects of the invention are further at least partially solved by a plant for removing carbon dioxide ($CO_2$) from synthesis gas, wherein the synthesis gas comprises at least hydrogen ($H_2$), carbon monoxide (CO), carbon dioxide ($CO_2$) and water ($H_2O$), comprising the following plant components in fluid connection with one another;
(a) means for cooling the synthesis gas below the dew point of water;
(b) means for separating water condensed out of the synthesis gas;
(c) means for cooling a hygroscopic, physical absorption medium;
(d) an absorption column for running the cooled synthesis gas freed of water and the cooled absorption medium in countercurrent at elevated pressure for removal of carbon dioxide from the synthesis gas, wherein synthesis gas at least partially freed of water and carbon dioxide is obtainable and absorption medium laden with carbon dioxide and partially co-absorbed carbon monoxide and hydrogen is obtainable;
(e) means for discharging the synthesis gas freed of water and carbon dioxide from the plant;
(f) a plurality of serially arranged flash stages comprising a first flash stage for removal of the co-absorbed carbon monoxide and hydrogen from the laden absorption medium and comprising a flash stage arranged downstream of the first flash stage for removal of carbon dioxide from the laden absorption medium;
(g) a compressor for compressing carbon monoxide and hydrogen removed from laden absorption medium and for recycling the compressed carbon monoxide and hydrogen to the absorption column (c);
(h) means for discharging carbon dioxide removed from laden absorption medium from the plant.

The plant is in particular part of a larger plant or a plant complex for production of hydrogen.

One embodiment of the plant according to the invention is characterized in that the plurality of serially arranged flash stages (f) has a distillation apparatus for removal of water from the absorption medium arranged downstream of it.

One embodiment of the plant according to the invention is characterized in that the plant comprises means for withdrawing absorption medium vapours from the distillation apparatus and means for introducing the absorption medium vapours into the flash stage arranged downstream of the first flash stage for use of the absorption medium vapours as stripping medium.

The objects of the invention are further at least partially solved by a use of the process according to the invention or the plant according to the invention for separation of carbon dioxide from sulfur-free synthesis gas.

BRIEF DESCRIPTION OF THE DRAWING

For a further understanding of the nature and objects for the present invention, reference should be made to the following detailed description, taken in conjunction with the accompanying drawings, in which like elements are given the same or analogous reference numbers and wherein:

FIG. 1 illustrates a schematic representation of one embodiment of the present invention.

DETAILED DESCRIPTION OF PREFERRED EMBODIMENTS

FIG. 1 shows a simplified process flow diagram of a possible embodiment of an inventive process 100 or an inventive plant 100. According to this embodiment the absorption medium is methanol. In the process flow diagram gas streams are represented by dashed lines and liquid streams are represented by solid lines. The flow direction of the respective stream is indicated by arrows.

Synthesis gas from a reformer unit (ATR, SMR, POx, GHR or combinations thereof) which was further treated in a water gas shift unit arranged downstream of the reforming unit (both not shown) is supplied via conduit 1 and initially cooled below the dew point of water in heat exchanger HX-01 using a carbon dioxide stream from conduit 4. The cooled synthesis gas is sent on via conduit 31 and condensed water is separated from the synthesis gas in separator D-01. Synthesis gas and uncondensed water is sent on via conduit 5 and in heat exchanger HX-02 further cooled to a temperature of −10° C. against purified synthesis gas from conduit 16. To prevent the formation of ice in conduit 5 methanol is supplied via conduit 8. Synthesis gas cooled to −10° C. in heat exchanger HX-02 is sent on via conduit 32 and in separator D-02 a further amount of water is separated from the synthesis gas and supplied via conduit 34 to the conduit 33.

The synthesis gas largely freed of water and cooled is sent on via conduit 14 and supplied to absorption column T-01 in which it is subjected to a physical absorption step. Absorption column T-01 is operated at an absorption pressure of 40 bar. In the absorption column T-01 cold methanol as absorption medium from the conduits 13 and 22 is passed from top to bottom while the synthesis gas from conduit 14 is run in countercurrent from bottom to top, thus resulting primarily in absorption of carbon dioxide in methanol as well as co-absorption of relatively small amounts of value gases (carbon monoxide and hydrogen) in methanol. Any residual amounts of water not condensed in the separators D-01 and D-02 are simultaneously dissolved in methanol in the absorption column T-01. Purified synthesis gas, i.e. synthesis gas largely freed of water and carbon dioxide, is withdrawn from the absorption column T-01 via conduit 16. The synthesis gas subsequently cools a sub-amount of laden methanol diverted from conduit 9 using pump P-02 from conduit 10 and sent on via conduit 11 in heat exchanger HX-06. The purified synthesis gas is subsequently sent on via conduit 15 and in heat exchanger HX-02 cools the untreated synthesis gas from conduit 5. The purified synthesis gas is subsequently withdrawn from the process via conduit 6. It is optionally sent to a further purification step, for example a pressure swing adsorption plant (PSA) for production of pure hydrogen, and then sent to a further use, for example a methanol or ammonia synthesis.

In the sump region of the absorption column T-01 laden methanol is withdrawn via conduit 9, The laden methanol contains carbon dioxide and in relatively small amounts co-absorbed value gases (carbon monoxide and hydrogen) as absorbed gas components. A portion of the laden methanol is diverted from conduit 9 via conduit 10 using pump P-02, sent on via conduit 11 and in heat exchanger HX-06 cooled against purified synthesis gas from conduit 16. It is subsequently sent on via conduit 12 and cooled to −35° C. in coolant cooler HU-01. The cooled laden methanol is subsequently sent on via conduit 13 and introduced into absorption column T-01 for reabsorption of carbon dioxide.

The majority of the laden methanol is introduced into the flash column T-02 via conduit 9. The pressure is initially reduced to 18 bar via the pressure reduction valve arranged in conduit 9. In the lower portion of the flash column this pressure reduction initially brings about in a first flash step liberation of essentially co-absorbed value gases (carbon monoxide and hydrogen) which are withdrawn via conduit 26 and sent to compressor C-01. Laden methanol decompressed to 18 bar is sent on via conduit 18 and decompressed to 8 bar via the pressure reduction valve arranged in conduit 18. In the middle portion of the flash column this further pressure reduction brings about in a second flash step further liberation of essentially co-absorbed value gases (carbon monoxide and hydrogen) which are withdrawn via conduit 17 and sent to compressor C-01. Compressor C-01 compresses the value gases from the conduits 17 and 26 to absorption pressure (40 bar). The compressed value gases are subsequently recycled into the absorption column T-01 via the conduits 7, 5, 32 and 14.

The methanol withdrawn from the second flash stage via conduit 19 is in heat exchanger HX-04 heated using a portion of the raw synthesis gas from conduit 1 (not shown) and via conduit 20 sent to a third flash stage in the upper portion of the flash column. The third flash stage is a flash stage arranged downstream of the first and second flash stage. Arranged in conduit 20 is a further pressure reduction valve which decompresses the laden methanol primarily containing carbon dioxide as absorbed gas components to 1.3 bar.

The third flash stage is supplied via conduit 25 with methanol vapours from rectification column T-03 which are used as stripping medium in the third flash stage and increase the amount of the carbon monoxide expelled (desorbed) from the absorption medium in the third flash stage compared to a pure flash arrangement. The third flash stage may thus also be considered a stripping stage, wherein methanol vapours are used as stripping medium. The heating via heat exchanger HX-04 of the laden methanol supplied via conduit 20 also has a positive effect on the yield of the separated carbon dioxide. The carbon dioxide obtained from the third flash stage is withdrawn from this flash stage via conduit 4, It has a low temperature of −36° C. and is therefore utilized for cooling this raw synthesis gas from conduit 1 in heat exchanger HX-01. The carbon dioxide product is sent on via conduit 2 and compressed by compressor C-02. The compressed carbon dioxide may subsequently be stored (CCS) or sent to a further use (CCU).

The methanol obtained in the third flash stage comprises only a low residual content of absorbed carbon dioxide. It is withdrawn from the third flash stage via conduit 21 and compressed to absorption pressure (40 bar) using pump P-01 it is subsequently sent on via conduit 22 and supplied to the top region of the absorption column T-01 for reabsorption of carbon dioxide.

Since the absorption medium methanol is permanently recirculated and undergoes a large number of absorption and desorption cycles it is over time enriched with water absorbed from the raw synthesis gas in the absorption column T-01. Therefore, a portion of the methanol largely freed of absorbed constituents is diverted from conduit 22 and via conduit 23 initially heated against hot methanol vapours from conduit 27 in heat exchanger HX-05. The amount of the methanol withdrawn via conduit 23 is adjusted such that water cannot accumulate in the methanol in the circuit between absorption column T-01 and the flash column, i.e. a predefined threshold concentration is not exceeded. It is subsequently sent via conduit 24 to an upper region of the rectification column T-03. Arranged in conduit 24 is a pressure reduction valve through which the methanol is decompressed to 2 bar, Water is also supplied to a middle region of the rectification column T-03. This is the water separated from the raw synthesis gas in the separators D-01 and D-02. This is supplied via conduit 33 and in heat exchanger HX-03 is heated against hot water exiting the rectification column T-03 as sump product via conduit 29. Rectification column T-03 is further heated with fresh steam via a boiler (not shown). Rectification column T-03 essentially performs a separation of methanol and water, wherein methanol vapours exit the rectification column T-03 as top product via conduit 27, are slightly cooled against methanol from conduit 23 in heat exchanger HX-05 and as mentioned above are introduced into the third flash stage as stripping medium via conduit 25.

In an alternative embodiment (not shown) the methanol vapours withdrawn from conduit 27 are completely condensed and the thus obtained condensed methanol is sent to conduit 22 for further introduction into the absorption column T-01.

Water is withdrawn from rectification column T-03 as sump product via conduit 29, cooled against water from conduit 33 and withdrawn from the process.

The following table shows an example for a mass balance according to the above-described embodiments of the inventive process. The synthesis gas supplied via conduit 1 is a synthesis gas treated in a water gas shift unit having a high carbon dioxide and a high hydrogen content. The proportion of carbon monoxide is correspondingly low. Inert constituents such as methane and nitrogen and small amounts of methanol are also present. This is referred to as raw synthesis gas in the following table.

The synthesis gas substantially freed of carbon dioxide and completely freed of water which is withdrawn from the process via conduit 6 is referred to as purified synthesis gas.

Also shown is the carbon dioxide product which is withdrawn from the process via conduit 3.

Also shown is the water which is withdrawn from the process via conduit 30.

The mass balance was generated by simulation using the process simulation software "Aspen Plus V9".

| Mole fraction | Unit | Raw synthesis gas | Purified synthesis gas | Carbon dioxide product | Water |
|---|---|---|---|---|---|
| Carbon dioxide ($CO_2$) | mol/mol | 0.247 | 0.045 | 0.986 | 0.00 |
| Hydrogen ($H_2$) | mol/mol | 0.714 | 0.915 | 0.002 | 0.00 |
| Nitrogen ($N_2$) | mol/mol | 0.001 | 0.002 | 0.000 | 0.00 |
| Carbon monoxide (CO) | mol/mol | 0.010 | 0.012 | 0.001 | 0.00 |
| Methane ($CH_4$) | mol/mol | 0.021 | 0.025 | 0.008 | 0.00 |
| Methanol ($CH_3OH$) | mol/mol | 0.002 | 0.000 | 0.002 | 0.00 |
| Water ($H_2O$) | mol/mol | 0.005 | 0.000 | 0.000 | 1.00 |
| Total amount of substance flow | kmol/hr | 12514 | 9715 | 2690 | 61 |
| Temperature | °C. | 40 | 40 | 40 | 40 |
| Pressure | bar | 41 | 39.3 | 1.1 | 3.8 |

The mass balance shows that the process according to the invention makes it possible to obtain a (dry) carbon dioxide product freed of water which has a high carbon dioxide proportion of 98.6 mol %.

The following table shows two examples (Example 1 and Example 2) according to the inventive process which shows the following parameters:
- the proportion of the hydrogen obtained in the purified synthesis gas (conduit 6) based on the hydrogen theoretically obtainable from the raw synthesis gas ($H_2$ recovery),
- the proportion of the carbon dioxide separated from the raw synthesis gas based on the theoretically separable carbon dioxide ($CO_2$ capture rate),
- the required cooling power,
- the required cooling water amount and
- the required electrical energy According to Example 1 the methanol vapours obtained in the rectification column T-03 (conduit 27) are completely condensed by a cooler and recycled into the absorption column T-01 for utilization as absorption medium (not shown in FIG. 1).

According to Example 2 the methanol vapours obtained in the rectification column T-03 (conduit 27) are passed on via conduit 25 and utilized as stripping medium in the third flash stage of the flash column T-02.

The values determined in the following table were obtained by simulation using the software "Aspen Plus V9".

|  |  | Example 1 | Example 2 |
|---|---|---|---|
| $H_2$ recovery | % | 99.9 | 99.9 |
| $CO_2$ capture rate | % | 85.2 | 85.9 |
| Coolant power | MW | 4.40 | 4.41 |
| Cooling water amount | t/h | 794 | 27 |
| Electrical energy | kW | 2486 | 2383 |

In both examples hydrogen is completely recovered from the employed synthesis gas. It has surprisingly been shown that the process mode of Example 2 allows a larger amount of carbon dioxide to be recovered. It is moreover surprising that this does not require a significantly higher coolant power and that the amount of electrical energy required falls. Since, in addition, the methanol vapours from conduit 27 are not condensed the required cooling water amount, i.e. the cooling water flow, falls drastically.

Embodiments of the invention are described with reference to different types of subject-matter. In particular, certain embodiments are described with reference to process claims while other embodiments are described with reference to apparatus claims. However, it will be apparent to a person skilled in the art from the description hereinabove and hereinbelow that unless otherwise stated in addition to any combination of features belonging to one type of claim any combination of features relating to different types of subject-matter or types of claim may also be contemplated. Features may be combined to achieve synergistic effects which go beyond simple summation of the technical features.

While the invention has been represented and described in detail in the drawing and the preceding description, such a representation and description shall be considered elucidatory or exemplary and non-limiting. The invention is not limited to the disclosed embodiments. Other variations of the disclosed embodiments may be understood and executed by those skilled in the art of the field of the claimed invention from a study of the drawing, the disclosure and the dependent claims.

LIST OF REFERENCE SYMBOLS

1 to 34 Conduit
HX-01 to HX-06 Heat exchanger
HU-01 Coolant cooler
D-01, D-02 Separator
T-01 Absorption column
T-02 Flash column
T-03 Rectification column
P-01, P-02 Pump
C-01, C-02 Compressor

What is claimed is:

1. A process for removing carbon dioxide from synthesis gas, wherein the synthesis gas comprises at least hydrogen, carbon monoxide, carbon dioxide and water, comprising:
   (a) providing a hygroscopic physical absorption medium;
   (b) at least partially removing water from the synthesis gas by cooling the synthesis gas below the dew point of water and separating the condensed water;
   (c) cooling the absorption medium;
   (d) removing carbon dioxide from the cooled synthesis gas via the cooled absorption medium in a physical absorption step at elevated pressure, wherein the cooled synthesis gas and the cooled absorption medium are run in countercurrent, wherein synthesis gas at least partially freed of water and carbon dioxide is obtained and absorption medium laden with carbon dioxide and partially co-absorbed carbon monoxide and hydrogen is obtained;

(e) discharging the synthesis gas at least partially freed of water and carbon dioxide from the process;

(f) treating the laden absorption medium in a plurality of serially arranged flash stages, wherein co-absorbed carbon monoxide and hydrogen is removed from the laden absorption medium in at least one first flash stage and carbon dioxide is removed from the laden absorption medium in a flash stage arranged downstream of the first flash stage;

(g) compressing to absorption pressure and recycling to step (d) the carbon monoxide and hydrogen obtained in step (f); and (h) discharging the carbon dioxide obtained in step (f) from the process.

2. The process according to claim 1, wherein water is removed from the absorption medium in a distillation step arranged downstream of step (f).

3. The process according to claim 2, wherein the distillation step for removal of water is operated temporarily.

4. The process according to claim 2, wherein absorption medium vapours obtained in the distillation step are utilized as a stripping medium for removal of carbon dioxide in the downstream flash stage according to step (f).

5. The process according to claim 1, wherein the downstream flash stage has a lower pressure compared to the first flash stage.

6. The process according to claim 1, wherein absorption medium obtained in the downstream flash stage is recycled to the physical absorption step according to step (d) for reabsorption of carbon dioxide.

7. The process according to claim 1, wherein the synthesis gas comprises no sulfur compounds as impurities.

8. The process according to claim 1, wherein the synthesis gas comprises no hydrogen cyanide and/or no ammonia as an impurity.

9. The process according to claim 1, wherein the carbon dioxide is not subjected to a drying step after discharging from the process according to step (h).

10. The process according to claim 1, wherein the carbon dioxide is not subjected to a condensation step.

11. The process according to claim 1, wherein the process comprises no hot regeneration step for regenerating the laden absorption medium.

12. The process according to claim 1, wherein water is removed by cooled absorption medium in a further physical absorption step at elevated pressure.

13. The process according to claim 1, wherein the provided hygroscopic, physical absorption medium comprises methanol or consists substantially of methanol or consists of methanol.

14. The process according to claim 1, wherein after discharging from the process according to step (h) the carbon dioxide is compressed and subsequently stored or sent to a further use.

15. The process according to claim 1, wherein an inert gas is utilized as stripping medium for removal of carbon dioxide in the downstream flash stage according to step (f).

16. A plant for removing carbon dioxide from synthesis gas, wherein the synthesis gas comprises at least hydrogen, carbon monoxide, carbon dioxide and water, comprising the following plant components in fluid connection with one another:

(a) a means for cooling the synthesis gas below the dew point of water;

(b) a means for separating water condensed out of the synthesis gas;

(c) a means for cooling a hygroscopic, physical absorption medium;

(d) an absorption column for running the cooled synthesis gas freed of water and the cooled absorption medium in countercurrent at elevated pressure for removal of carbon dioxide from the synthesis gas, wherein synthesis gas at least partially freed of water and carbon dioxide is obtainable and absorption medium laden with carbon dioxide and partially co-absorbed carbon monoxide and hydrogen is obtainable;

(e) a means for discharging the synthesis gas freed of water and carbon dioxide from the plant;

(f) a plurality of serially arranged flash stages comprising a first flash stage for removal of the co-absorbed carbon monoxide and hydrogen from the laden absorption medium and comprising a flash stage arranged downstream of the first flash stage for removal of carbon dioxide from the laden absorption medium;

(g) a compressor for compressing carbon monoxide and hydrogen removed from laden absorption medium and for recycling the compressed carbon monoxide and hydrogen to the absorption column (c); and (h) a means for discharging carbon dioxide removed from laden absorption medium from the plant.

17. The plant according to claim 16, wherein the plurality of serially arranged flash stages (f) has a distillation apparatus for removal of water from the absorption medium arranged downstream of it.

18. The plant according to claim 17, wherein the plant comprises means for withdrawing absorption medium vapours from the distillation apparatus and means for introducing the absorption medium vapours into the flash stage arranged downstream of the first flash stage for use of the absorption medium vapours as stripping medium.

* * * * *